(12) United States Patent
Ma et al.

(10) Patent No.: US 8,665,562 B2
(45) Date of Patent: Mar. 4, 2014

(54) METHOD OF RELIABLE USAGE OF DYNAMIC FLY-HEIGHT CONTROL AT ENVIRONMENTAL EXTREMES

(75) Inventors: Yiping Ma, Layton, UT (US); William Dredge Hansen, North Ogden, UT (US)

(73) Assignee: EMC Corporation, Hopkinton, MA (US)

( * ) Notice: Subject to any disclaimer, the term of this patent is extended or adjusted under 35 U.S.C. 154(b) by 1132 days.

(21) Appl. No.: 11/938,965

(22) Filed: Nov. 13, 2007

(65) Prior Publication Data

US 2009/0122444 A1    May 14, 2009

(51) Int. Cl.
G11B 5/17 (2006.01)
G11B 5/127 (2006.01)

(52) U.S. Cl.
USPC .................. 360/125.31; 360/125.74

(58) Field of Classification Search
USPC ......... 360/75, 125.31, 125.74, 128, 294.1, 31
See application file for complete search history.

(56) References Cited

U.S. PATENT DOCUMENTS

| | | | | |
|---|---|---|---|---|
| 2005/0046985 | A1* | 3/2005 | Morinaga et al. | 360/75 |
| 2006/0023354 | A1* | 2/2006 | Stipe | 360/128 |
| 2006/0034013 | A1* | 2/2006 | Kato et al. | 360/128 |
| 2007/0064332 | A1* | 3/2007 | Higashiya | 360/75 |
| 2007/0165324 | A1 | 7/2007 | Kwon et al. | |
| 2007/0195449 | A1 | 8/2007 | Feist et al. | |
| 2007/0230002 | A1 | 10/2007 | Kassab | |
| 2007/0230020 | A1 | 10/2007 | Leis | |
| 2007/0247744 | A1 | 10/2007 | Satoh et al. | |
| 2007/0247758 | A1* | 10/2007 | Kurita et al. | 360/234.7 |
| 2007/0268612 | A1* | 11/2007 | Fitzpatrick et al. | 360/75 |

OTHER PUBLICATIONS

International Search Report and Written Opinion for PCT/US2008/082773 dated Jan. 30, 2009.

* cited by examiner

*Primary Examiner* — Joseph Feild
*Assistant Examiner* — Gustavo Polo
(74) *Attorney, Agent, or Firm* — Pattric J. Rawlins; Procopio, Cory, Hargreaves & Savitch LLP

(57) ABSTRACT

A method of dynamic fly-height control in a disk drive, comprising measuring current environmental parameters, determining an operation heater power based on the current environmental parameters, and applying the operation heater power to adjust the fly-height of a head. Using the current environmental parameters to interpolate an estimated current touch down heater power from the predetermined set of environmental parameters and plurality of corresponding touch down heater powers. A system of dynamic fly-height control includes a touch down power module to generate a plurality of environmental parameters and corresponding touch down heater powers, an environment module to receive the plurality of environmental parameters and corresponding touch down heater powers and generate an estimated touch down heater power based on measured current environmental parameters, and a heater module to receive the estimated touch down heater power and generate an operation heater power to control a fly-height of a head.

15 Claims, 6 Drawing Sheets

METHOD OF RELIABLE USAGE OF DYNAMIC FLY-HEIGHT CONTROL AT ENVIRONMENTAL EXTREMES

TECHNICAL FIELD

This invention relates to computer storage products, and more particularly to controlling a transducer fly-height for disk drives.

BACKGROUND

A disk drive is a data storage device that stores data in concentric tracks on a disk. Data are written to or read from the disk by spinning the disk about a central axis while positioning a transducer near a target track of the disk. During a read operation, data are transferred from the target track to an attached host through the transducer. During a write operation, data are transferred in the opposite direction.

During typical disk drive operation, the transducer does not contact the surface of the disk. Instead, the transducer rides on a cushion of air generated by the motion of the disk. The transducer is normally mounted within a slider structure that provides the necessary lift in response to the air currents generated by the disk. The distance between the transducer and the disk surface during disk drive operation is known as the "fly-height."

The fly-height is controlled by a suspension attached to the slider. The suspension supports the read/write elements (i.e., transducer) and the air bearing of the slider. Certain conditions can alter the fly-height by creating disturbances between the airbearing and the disk surface. These conditions generally include extremes in environmental conditions such as the ambient air pressure (typically a function of altitude) and temperature, as well as extremes in contamination levels. Extremes in any of these conditions are taken into account during the development of airbearing designs because they may cause degradations in the error rate performance of the drive.

Because the transducer is held aloft during disk drive operation, friction and wear problems associated with contact between the transducer and the disk surface are therefore usually avoided. However, due to the extremely close spacing of the heads and disk surface, errors in fly-height control can lead to a head crash, where the head scrapes on the platter surface and grinds the thin magnetic film away. For giant magnetoresistive head technologies (GMR heads) in particular, a minor head contact that does not remove the magnetic surface of the disk can still result in the head temporarily overheating due to friction with the disk surface, rendering the disk unreadable until the head temperature stabilizes.

Dynamic fly-height control technologies have therefore become essential in many recent hard drive recording products. The technology is still in its early stages of use and adoption, however, and typical usage models have been relatively simple implementations. In one example, the fly-height is adjusted dynamically according to an average behavior of a population of hard drives operating under normal environmental conditions. However, this approach does not provide adequate performance when the hard drive is operated at environmental extremes. Deviations of individual read/write head behaviors from the population average behavior may be so large that control actions that would be effective for the average population instead result in over- or under-controlling the fly-height. These excursions of the control actions eventually cause reliability problems when many hard drives are deployed in the field.

Therefore, what is needed is a method of controlling the fly-height that effectively accounts for the individual behaviors of substantially all hard drives under extreme environmental operating conditions.

SUMMARY

Embodiments of the present invention as presented herein provide at least for a method of dynamic fly-height control in a disk drive, comprising measuring current environmental parameters, determining an operation heater power based on the current environmental parameters, and applying the operation heater power to adjust the fly-height of a head. In an implementation, the method further comprises determining a plurality of touch down heater powers corresponding to a predetermined set of environmental parameters. In another implementation, determining an operation heater power includes using the current environmental parameters to interpolate an estimated current touch down heater power from the predetermined set of environmental parameters and plurality of corresponding touch down heater powers.

In an embodiment, a system of dynamic fly-height control in a disk drive includes a touch down power module to generate a plurality of environmental parameters and corresponding touch down heater powers, an environment module to receive the plurality of environmental parameters and corresponding touch down heater powers and generate an estimated touch down heater power based on measured current environmental parameters, and a heater module to receive the estimated touch down heater power and generate an operation heater power to control a fly-height of a head. In one implementation, the touch down power module determines a corresponding touch down heater power from a tuple of environmental parameters. In another implementation, the tuple of environmental parameters includes a temperature value and a pressure value.

BRIEF DESCRIPTION OF THE DRAWINGS

These and other features and advantages of the invention will become more apparent upon reading the following detailed description and upon reference to the accompanying drawings.

DETAILED DESCRIPTION

Many disk drives use a heater element, located in proximity to the read/write element of the head, to control the extension and retraction of a protrusion below the read/write element. The space between the protrusion (i.e., the read/write element) and the surface of the disk is the fly-height, which is optimally adjusted differently for read and write operations.

The current provided to the heater element controls the size of the protrusion, which in turn controls the fly-height. The amount of current used to produce the various fly-heights may be determined during manufacture as an average value for a population of hard disks. However, disk drives often respond variously to given levels of the control current to the heater element. Under extreme environmental conditions, such as in temperature and/or air pressure, the averaged values for the current that may be effective for the population of disk drives can instead be too large or small to obtain a proper fly-height for a particular drive, thus leading to failures.

Embodiments of the present invention as presented herein provide at least for a method of dynamic fly-height control in a disk drive, comprising measuring current environmental parameters, determining an operation heater power based on the current environmental parameters, and applying the operation heater power to adjust the fly-height of a head. In an implementation, the method further comprises determining a plurality of touch down heater powers corresponding to a predetermined set of environmental parameters. In another implementation, determining an operation heater power includes using the current environmental parameters to interpolate an estimated current touch down heater power from the predetermined set of environmental parameters and plurality of corresponding touch down heater powers.

In an embodiment, a system of dynamic fly-height control in a disk drive includes a touch down power module to generate a plurality of environmental parameters and corresponding touch down heater powers, an environment module to receive the plurality of environmental parameters and corresponding touch down heater powers and generate an estimated touch down heater power based on measured current environmental parameters, and a heater module to receive the estimated touch down heater power and generate an operation heater power to control a fly-height of a head. In one implementation, the touch down power module determines a corresponding touch down heater power from a tuple of environmental parameters. In another implementation, the tuple of environmental parameters includes a temperature value and a pressure value.

Figure 1:
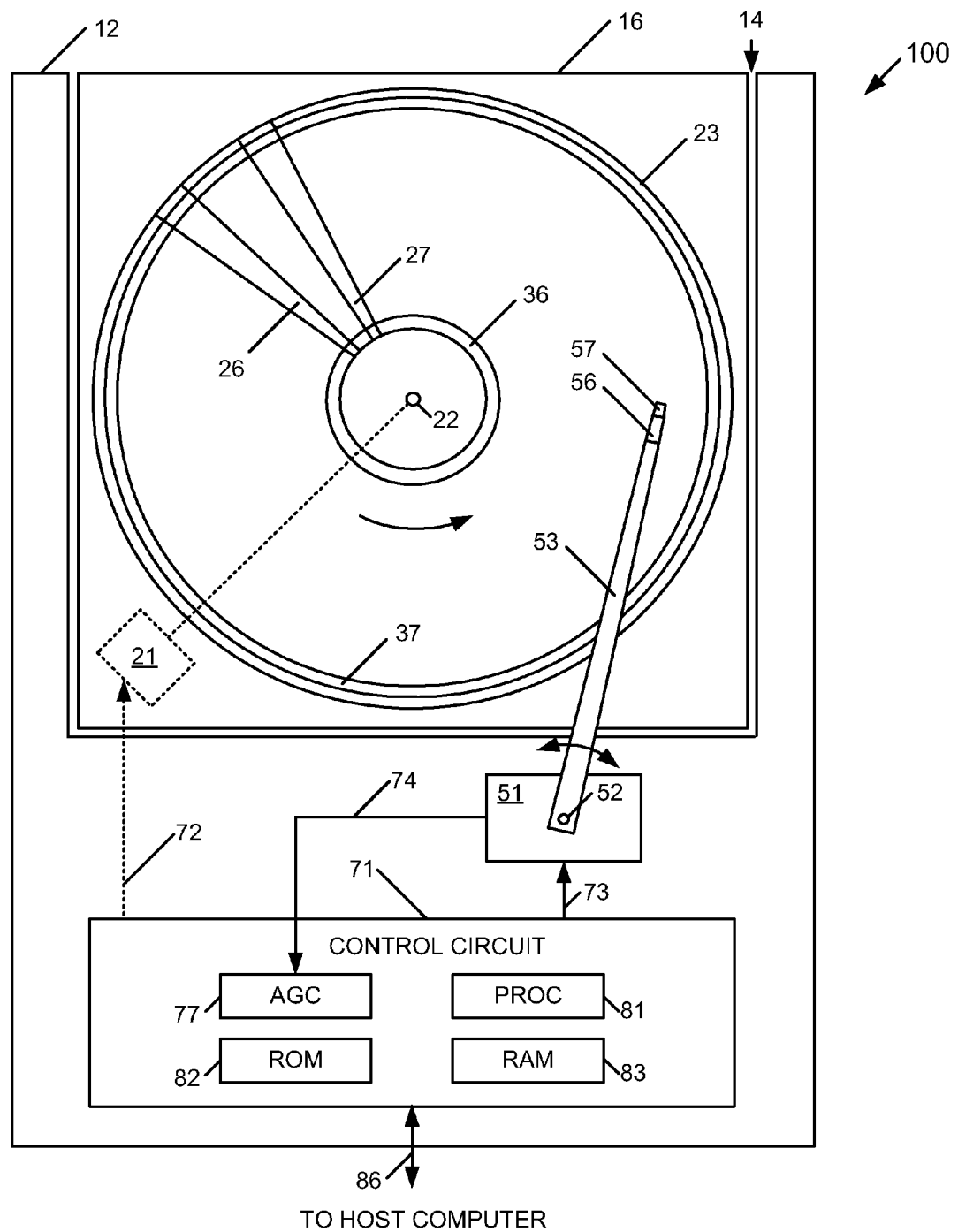
FIG. 1 is a diagrammatic view of a disk drive apparatus embodying aspects of the present invention.

FIG. 1 is a diagrammatic view of a disk drive storage system ("system") 100 embodying aspects of the present invention. The system 100 includes a receiving unit or drive 12 which has a recess 14, and includes a cartridge 16 which can be removably inserted into the recess 14.

The cartridge 16 has a housing, and has within the housing a motor 21 with a rotatable shaft 22. A disk 23 is fixedly mounted on the shaft 22 for rotation therewith. The side of the disk 23 which is visible in FIG. 1 is coated with a magnetic material of a known type, and serves as an information storage medium. This disk recording surface is conceptually divided into a plurality of concentric data tracks. For example, there may be approximately 50,000 data tracks, though not all of which are available for use in storing user data.

The disk recording surface is also conceptually configured to have a plurality of circumferentially spaced servo wedges 26, 27. The portions of the data tracks which fall within the servo wedges 26, 27 are not used to store data. Data are stored in the portions of the data tracks which are located between the servo wedges 26, 27. The servo wedges 26, 27 are used to store servo information of a type which is known in the art. The servo information in the servo wedges 26, 27 conceptually defines a plurality of concentric servo tracks, which have a smaller width or pitch than the data tracks. In the disclosed embodiment, each servo track has a pitch or width that is approximately two-thirds of the pitch or width of a data track. Consequently, the disclosed disk 23 has about 73,000 servo tracks. The servo tracks effectively define the positions of the data tracks, in a manner known in the art.

Data tracks are arranged in a concentric manner ranging from radially innermost track 36 to outermost track 37. User data are stored in the many data tracks that are disposed from the innermost track 36 to the outermost track 37 (except in the regions of the servo wedges 26, 27).

The drive 12 includes an actuator 51 of a known type, such as a voice coil motor (VCM). The actuator 51 can effect limited pivotal movement of a pivot 52. An actuator arm 53 has one end fixedly secured to the pivot 52, and extends radially outwardly from the pivot 52. The housing of the cartridge 16 has an opening in one side thereof. When the cartridge 16 is removably disposed within the drive 12, the arm 53 extends through the opening in the housing, and into the interior of the cartridge 16. At the outer end of the arm 53 is a suspension 56 of a known type, which supports a read/write head 57. In one example, the head 57 is a component commonly referred to as a giant magneto-resistive (GMR) head. However, it will be appreciated that it can also be another type of head, such as a magneto-resistive (MR) head.

During normal operation, the head 57 is disposed adjacent the magnetic recording surface on the disk 23, and pivotal movement of the arm 53 causes the head 57 to move approximately radially with respect to the disk 23, within a range including the innermost track 36 and the outermost track 37. When the disk 23 is rotating at a normal operational speed, the rotation of the disk 23 induces the formation of an air cushion, commonly known as an air bearing, between the disk recording surface and the head 57. The head 57 floats on the air bearing while reading and writing information to and from the disk 23, without direct physical contact with the disk 23. As discussed above, the distance at which the head 57 floats above the disk is known as the "fly-height."

The drive 12 includes a control circuit 71, which is operationally coupled 72 to the motor 21 in the cartridge 16. The control circuit 71 selectively supplies power to the motor 21. The motor 21 effects rotation of the disk 23 while the motor 21 is receiving power. The control circuit 71 also provides control signals 73 to the actuator 51, in order to control the pivotal position of the arm 53. The control circuit 71 receives a channel signal 74 from the head 57. When the disk 23 is rotating, segments of servo information and data alternately move past the head 57, and the channel signal 74 thus includes alternating segments or bursts of servo information and data.

The control circuit 71 includes a channel circuit which processes the received channel signal 74. The channel circuit includes an AGC (automatic gain control) circuit 77. The AGC circuit 77 effects variation of a gain factor that influences the amplitude of the channel signal 74. In particular, the AGC circuit 77 uses a higher gain factor when the amplitude of the channel signal 74 is low, and uses a lower gain factor when the amplitude of the channel signal 74 is high. Consequently, the amplitude of the channel signal 74 has less variation at the output of the AGC circuit 77 than at the input thereof.

The control circuit 71 also includes a processor 81, a read only memory (ROM) 82, and a random access memory (RAM) 83. The ROM 82 stores a program, which is executed by the processor 81, and data that do not change. The processor 81 uses the RAM 83 to store data or other information that change dynamically during program execution.

The control circuit 71 of the drive 12 is coupled through a host interface 86 to a host computer (not shown). The host computer may send user data to the drive 12, which the drive 12 stores on the disk 23 of the cartridge 16. The host computer may also request that the drive 12 read specified user data from the disk 23, which the drive 12 reads and sends back to the host computer. In an example, the host interface 86 conforms to an industry standard protocol commonly known as the Universal Serial Bus (USB) protocol, but may alternatively conform to any other suitable protocol, including but not limited to the IEEE 1394 protocol.

In a disk drive, writing and reading data reliably at high areal densities requires that the fly-height between the read/write head and the disk recording surface be finely controlled. In one example, the fly-height must be on the order of 3 nm while writing and about 7 nm for reading. Generally, the fly-height cannot vary significantly for proper operation. Dynamic fly-height ("DFH") technology utilizes advances in read/write head materials to adjust the fly-height to such required spacings.

Figures 6A, 6B:
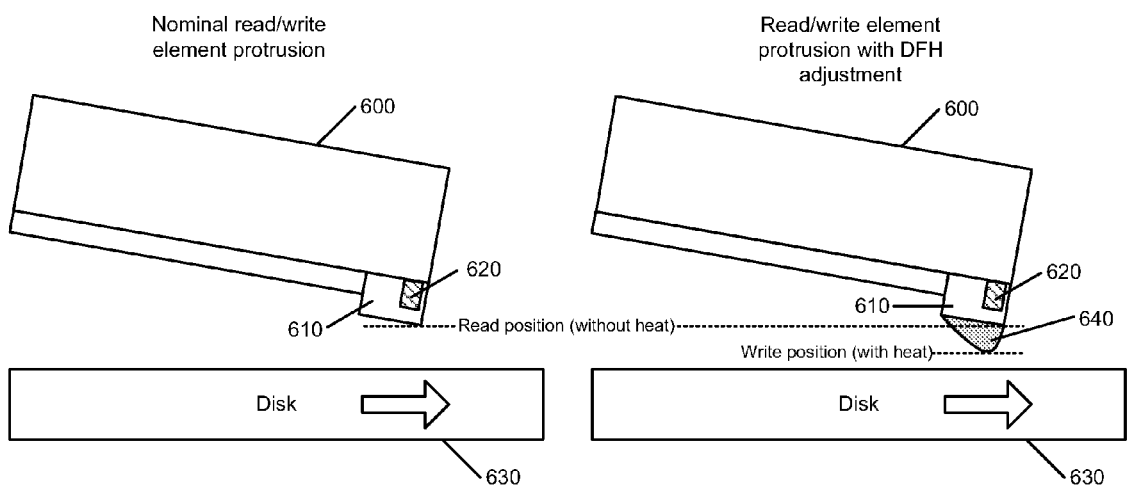
FIG. 6A illustrates a read/write element protrusion associated with a read position.
FIG. 6B illustrates an example read/write element protrusion with a dynamic fly-height adjustment.

FIGS. 6A and 6B provide a comparison illustration according to an example of DFH control. Referring to both FIGS. 6A and 6B, a head 600 includes a read/write element 610. The read/write element 610 includes within it a heater element 620.

The head 600 is designed to float above the disk 630 at a certain fly-height. In FIG. 6A, the fly-height is shown as the distance between the read/write element 610 corresponding to a read position. In FIG. 6B, the fly-height shown corresponds to a write position. When a write operation occurs, a current is applied to writer coils (not shown) located in the read/write head 610, in proximity to the heater element 620. The current causes the heater element 620 to increase in temperature. As the temperature of the heater element 620 increases, thermal expansion causes a DFH protrusion 640 to develop downward (i.e., toward the disk 630) at a portion of the read/write head 610, thus decreasing the fly-height.

The power to the heater element 620 (i.e., "heater power") is therefore a control action to adjust the fly-height, and to make further adjustments until a desired fly-height is achieved.

Typically the heater power at which the read/write element 610 touches down on the surface of the disk 630 (i.e., the "touch down heater power") is determined at the time the disk drive is manufactured. The "operation heater power" is the heater power applied during operation to maintain a fly-height. The operation heater power is smaller than the touch down heater power because more heater power is required to form a larger DFH protrusion 640, which reduces the fly-height, and can lead to contact the disk 630 surface (i.e., touch down).

The operation heater power is adjusted during operation according to environmental conditions such as temperature and ambient air pressure (or, simply "pressure"). The actual operation heater powers used are usually determined for predefined environmental conditions for entire populations of disk drives, resulting in population average power values for achieving particular adjustments in every disk drive of the population. Due to variations inherent to manufacturing processes, however, differences between disk drives result in many responding significantly differently from the population average response under given sets of environmental conditions. Population averages of operation heater values as applied to outlier disk drives may therefore be unnecessarily high, causing over-penetration and accelerated wear or failure due to contact between the read/write element 610 and the disk 630. Alternatively, where the operation heater power is too low, an under-penetration may occur, causing decreased read/write reliability and perhaps irrecoverable errors. Since the signal-to-noise ratio at the read/write element 610 is largely a function of the fly-height, large variations in fly-height due to varying responses to environmental conditions may also lead to lower recording densities. Therefore, the use of heater powers tailored individually to optimize fly-heights for each disk drive is advantageous over the use of population average values in that varying individual responses may be accounted for.

Figure 2:
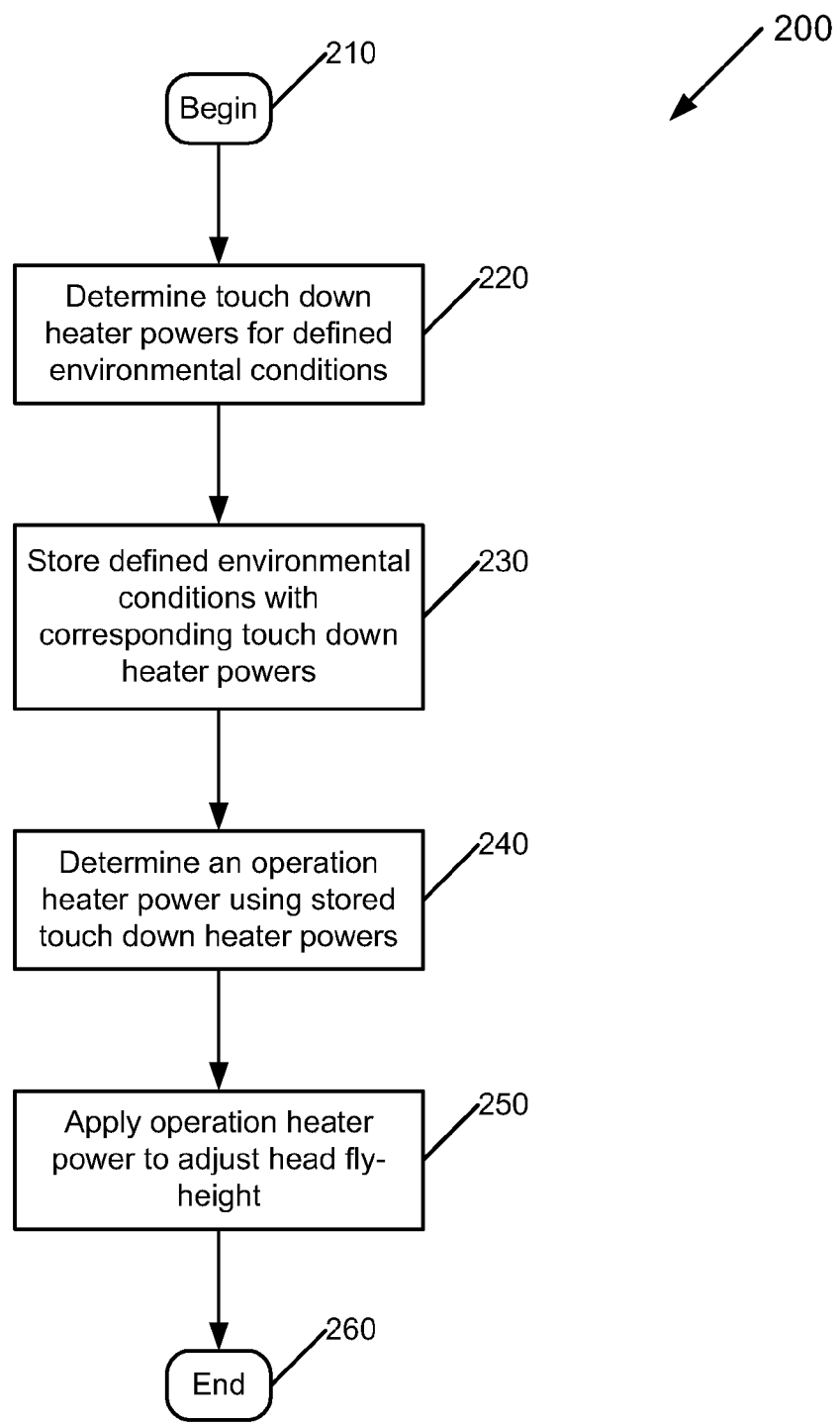
FIG. 2 is a flowchart illustrating an exemplary embodiment of a method of dynamic fly-height control in a disk drive.

FIG. 2 is a flowchart illustrating an embodiment of a method 200 of dynamic fly-height control in a disk drive. The method 200 commences, at block 210. At block 220, certain environmental parameters are predefined, usually as part of the manufacturing process. In one implementation, the environmental parameters include temperature/pressure tuples for which touch down heater powers are determined. A table defined by the temperature/pressure tuples and corresponding touch down heater powers may then be configured. Example temperature values range from 0° C. to 70° C. Example pressure values range from 120 kPa to 58 kPa. If temperatures and pressures outside of these ranges are encountered once the disk drive is deployed in the field, the ranges may be extended accordingly. In an implementation, temperature and pressure values are determined at predefined increments within these ranges. For example, temperatures are determined at 10° C. increments in the range of 0° C. to 70° C., and pressures are determined at 10 kPa increments in the range of 120 kPa to 58 kPa. In another implementation, the environmental conditions include humidity.

The predefined environmental conditions with corresponding touch down heater powers are stored, at block 230. In one implementation, a table data structure including the temperatures, pressures, and corresponding touch down heater powers is stored. It will be appreciated that a table is one of many types of data structures effective for storing these data, including data structures related to lists, linked lists, and databases.

Figure 3:
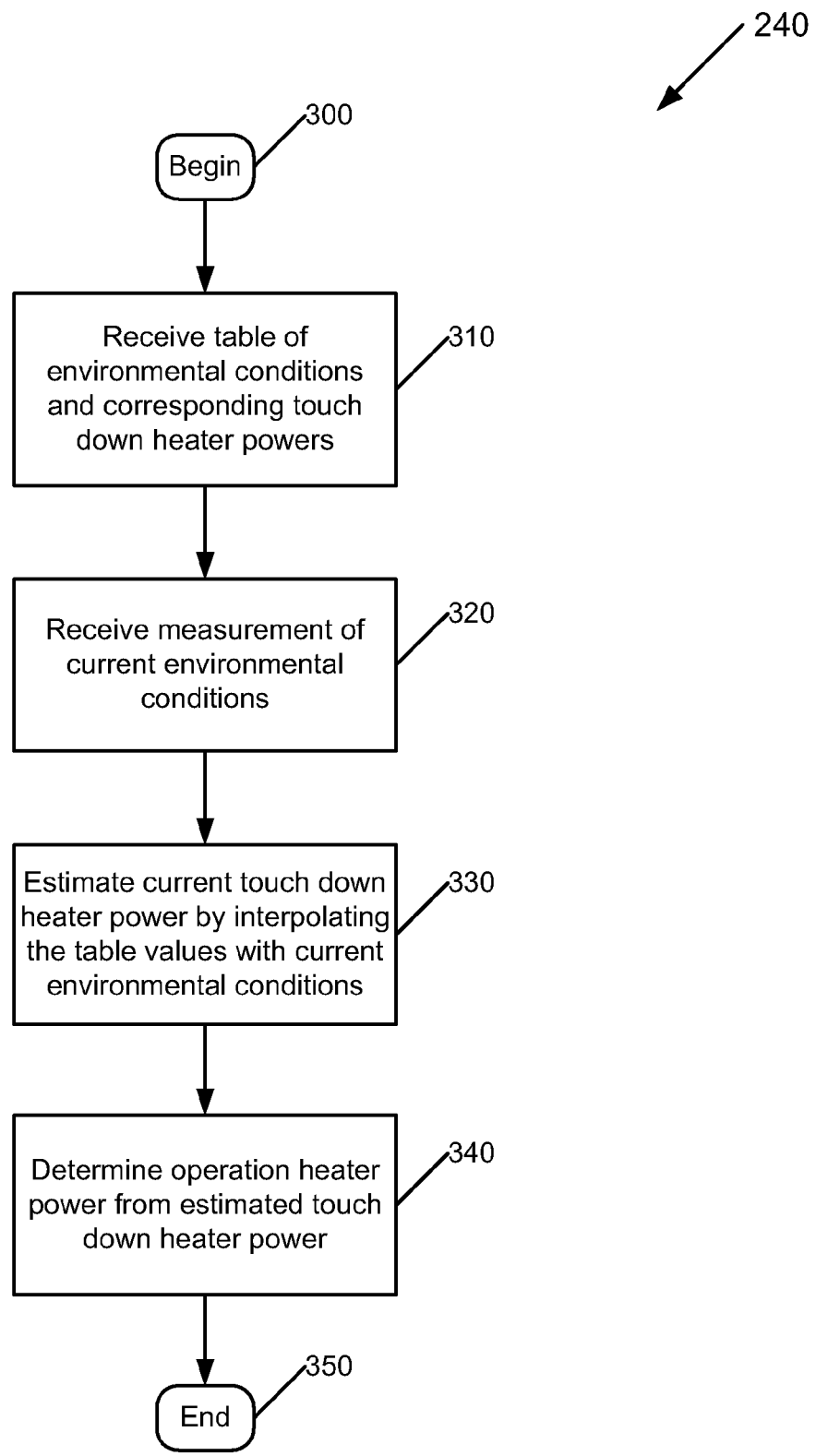
FIG. 3 is a flowchart illustrating an exemplary embodiment of a method of determining an operation heater power.

An operation heater power is determined using stored touch down heater values, at block 240. At block 250 operation heater power is applied to adjust head fly height and the process ends at block 260. In one embodiment, the operation heater power is determined according to the flowchart shown in FIG. 3, depicting a method of determining an operation heater power. Referring to FIG. 3, the method 240 commences, at block 300. A data structure (e.g., table) of environmental conditions and corresponding touch down heater powers is received, at block 310. At block 320, measurements of current (i.e., real time) ambient environmental conditions are received. Continuing the example of above, the measurements of environmental conditions include the current temperature and pressure parameters. The current temperature and pressure parameters are used to interpolate the temperature and pressure table to obtain an estimated touch down heater power at block 330. For example, a two-dimensional interpolation scheme may be employed to arrive at the estimate. At block 340, an operation heater power is determined from the estimated touch down heater power. In an implementation, the operation heater power is obtained by subtracting a predetermined value from the estimated touch down heater power. The method ends, at block 350.

Figure 4:
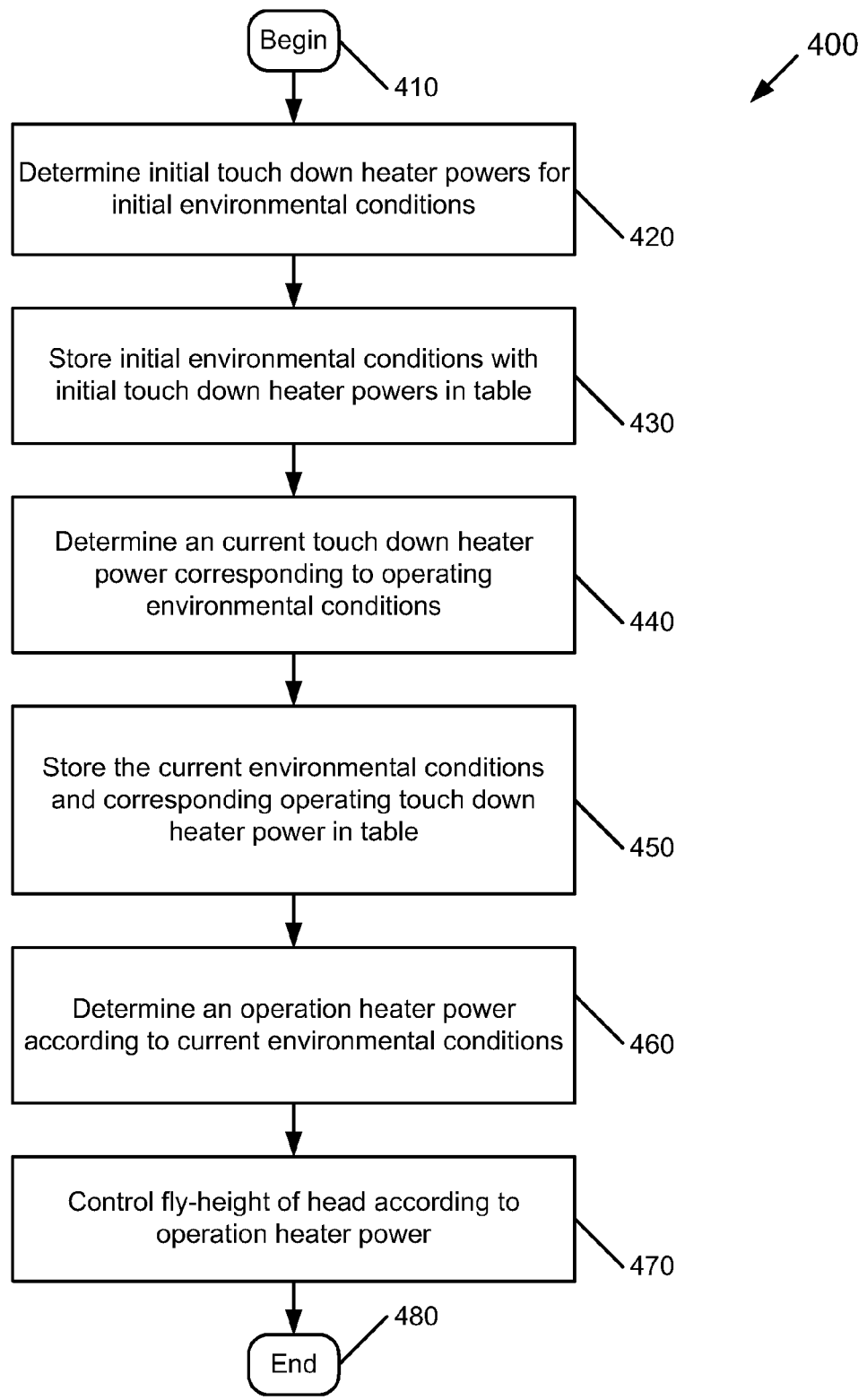
FIG. 4 is a flowchart illustrating an exemplary embodiment of a method of dynamic fly-height control in a disk drive.

FIG. 4 is a flowchart illustrating an embodiment of a method 400 of dynamic fly-height control in a disk drive. The method of this embodiment is similar to the method illustrated in the flowchart of FIG. 2, but provides for development of a touch down heater power table during normal operation of the disk drive.

The method 400 commences, at block 410. Initial touch down heater powers are determined for a set of initial environmental conditions, at block 420. The initial environmental conditions are typically the ambient environmental conditions existing at the time the drive is built. In an implementation, the environmental conditions include the ambient temperature and pressure. In another implementation, the environmental conditions include the ambient humidity. Continuing with the examples from above, initial temperature and pressure parameter tuples are measured at the time of build, after which an initial touch down heater power corresponding to the temperature and pressure tuple is determined. Multiple initial temperature and pressure tuples may also be acquired over a period of time, with corresponding touch down heater powers determined for each. In another example, multiple initial temperature, pressure, and humidity tuples may be acquired over a period of time, with corresponding touch down heater powers determined for each.

At block 430, the initial temperature and pressure values and corresponding touch down heater power(s) is(are) stored. In an implementation, the values are stored in a data structure such as table. The table may include temperature and pressure values within predefined ranges, at predefined intervals, with the initial ambient temperature and pressure values placed appropriately within. Using the example ranges discussed above, a table defining temperatures ranging from 0° C. to 70° C., at 10° C. intervals (increments), therefore includes predefined temperature values of 0, 10, 20, 30, 40, 50, 60, and 70° C. Pressures ranging from 120 kPa to 58 kPa, at 10 kPa intervals include predefined pressure values of 120, 110, 100, 90, 80, 70, 60, and 50 kPa. Example measured ambient environmental conditions of 16° C. and 102 kPa and a corresponding touch down heater power are therefore located in the table between the predefined values of 10° C. and 20° C., and 110 kPa and 100 kPa.

In an implementation, a table may be defined using temperatures at predefined intervals relative to the initial measured ambient temperature (e.g., 16° C.), with pressures at predefined intervals relative to the initial measured pressure (e.g., 102 kPa). For example, such a table defining temperatures ranging substantially from 0° C. to 70° C. may define temperature values of 1, 11, 21, 41, 51, 61, and 71° C. Pressure values defining the table may likewise include 122, 112, 102, 92, 82, 72, 62, and 52 kPa. In this case, the temperature/pressure tuple consisting of 16° C., 102 kPa would occupy a grid position in the table thus defined.

In another implementation, after the initial ambient temperature and pressure and corresponding touch down heater power are determined and stored in the table, further temperatures and pressures defining the table are determined under operational conditions, when the disk drive is subsequently deployed in the field. Accordingly, current environmental conditions are measured at certain times and a corresponding current touch down heater power is determined, at block 440. Current environmental conditions are defined herein as the ambient environmental conditions existing at a given time during operation. In one implementation, this occurs when environmental conditions substantially reach predefined values. Continuing an example from above, a table is predefined using the temperature and pressure values of 0, 10, 20, 30, 40, 50, 60, and 70° C. Measurements of current environmental conditions indicate that the current temperature is about 50° C. and the current pressure is about 95 kPa. A corresponding touch down heater power is determined for the temperature/pressure tuple of 50° C., 95 kPa, and all three values are appropriately stored in the table. Similarly, the current temperature and corresponding touch down heater power can be determined when the current pressure is measured to be substantially equal to one of the predefined pressure values of 120, 110, 100, 90, 80, 70, 60, and 50 kPa. These current environmental conditions and corresponding current touch down heater power are stored appropriately in the table. In another implementation, environmental conditions and a corresponding touch down heater power are determined on a temporal basis in addition to, or instead of, whenever the current environmental conditions reach predetermined values. For example, current environmental conditions might be measured periodically during a day or week, and a corresponding touch down heater power value determined accordingly.

Once determined, the current environmental conditions and corresponding current touch down heater power are combined with the initial environmental conditions, e.g., stored in the table, at block 450. Thus, the table is populated over time as the disk drive is operated in the field under various environmental conditions. Time and expense during manufacturing are advantageously saved because it is not required to artificially create the ranges of environmental conditions and then operate the disk drive under those conditions in order to populate the table with corresponding touch down heater powers.

An operation heater power is determined according to current environmental conditions, at block 460. In an implementation, whenever current environmental conditions and a corresponding current touch down heater power are determined and stored in the table, an operation heater power is also determined according to the current touch down heater power. At other times, the operation heater power is based on an estimated touch down heater power by interpolating the environmental conditions and corresponding touch down heater powers in the table according to the current environmental conditions. Since the operation heater power is generally always less than the touch down heater power, one method of determining the operation heater power includes subtracting a predefined value from the (estimated) current touch down heater power.

The operation heater power is then applied to the heater element to adjust the fly-height, at block 470. The method ends, at block 480.

Figure 5:
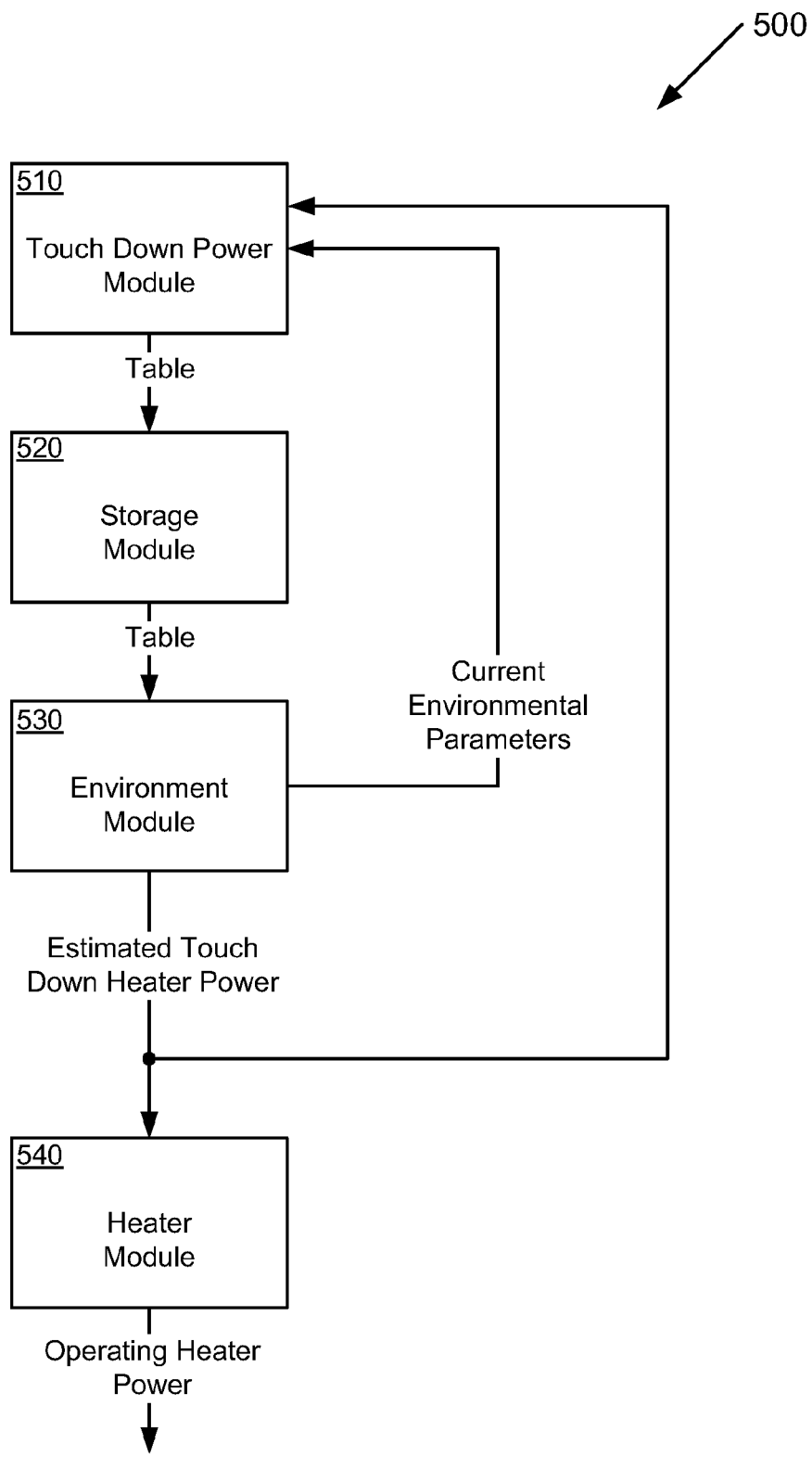
FIG. 5 is a functional block diagram illustrating an exemplary embodiment of a system of dynamic fly-height control in a disk drive.

FIG. 5 is a functional block diagram illustrating an embodiment of a system of dynamic fly-height control 500 in a disk drive. The system of dynamic fly-height control 500 includes a touch down power module 510, a storage module 520, an environment module 530 and a heater module 540. Generally, the system 500 employs methods such as those discussed above in relation to FIGS. 2, 3, and 4.

The touch down power module 510 is configured to determine touch down heater powers corresponding to various environmental conditions. In one embodiment, the touch down power module 510 determines a data structure maintaining a plurality of environmental parameters, such as temperature/pressure tuples. The data structure may be a table, for example, though other types of data structures are within the scope of the present invention. A corresponding touch down heater power is determined for the tuples of temperature and pressure represented in the table. The table may be defined by environmental parameters in certain ranges of values, and at certain intervals bounded by those ranges. The touch down power module 510 generates the table as an output, typically received by a storage module 520. In another embodiment, the touch down power module 510 receives current environmental parameters representing measurements of current environmental conditions. Usually, these conditions are measured after manufacture, during operation of the disk drive in the field. The touch down power module 510 also receives estimated current touch down heater powers corresponding to the current environmental parameters. The touch down power module 510 may then update an existing table, and regenerate the updated table for the storage module 510.

The storage module 520 receives and stores a data structure (e.g., table) with a plurality of environmental parameters and corresponding touch down heater powers. The storage module 520 is also configured to generate the stored data structure on output.

The environment module 530 is configured to receive a data structure with a plurality of environmental parameters and corresponding touch down heater powers, and to generate a plurality of estimated corresponding touch down heaters powers. The environment module 530 is also configured to obtain measurements of current environmental conditions (i.e., current environmental parameters). Using measurements of current temperature and pressure, the environment module 530 interpolates the temperature and pressure values in the table to determine an estimated current touch down heater power. The estimated touch down heater power is then generated as an output. In an embodiment, the measured current environmental parameters and corresponding estimated current touch down heater power are also generated as output, and passed to the touch down power module 510 where they are used to update an existing table, as discussed above.

The heater module 540 receives a touch down heater power and generates an operation heater power to control the fly-height of a head. Generally, the heater module 540 receives an estimated current touch down heater power from the environment module 530. In an implementation, the heater module 540 subtracts a predefined value from the received touch down heater power to generate the operation heater power to be output. It will be appreciated that other schemes may be used to obtain the operation heater power from a touch down heater power, including linear and non-linear transformations, and table look-ups. Generally, the operation heater power is always less than a corresponding touch down heater power because a greater heater power causes a larger DFH protrusion 640 the read/write element 610, as shown in FIG. 6B. Less heater power thus results in a smaller DFH protrusion 640 and a larger space between the read/write element 610 and the surface of the disk 630.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are representative of the subject matter which is broadly contemplated by the present invention.

What is claimed is:

1. A method of dynamic fly-height control in a disk drive, the method comprising:
generating a data structure comprising a plurality of touch down heater powers, wherein each of the plurality of touch down heater powers corresponds to environmental parameters, the environmental parameters comprising temperature and pressure values, and wherein each of the plurality of touch down heater powers represents an estimated heater power required to expand an element into physical contact with a surface of a medium;
measuring current environmental parameters including a temperature and a pressure;
based on the data structure, determining an estimated touch down heater power that corresponds to the measured current environmental parameters, wherein said determining an estimated touch down heater power comprises interpolating the estimated touch down heater power from the data structure;
determining an operation heater power based on the determined estimated touch down heater power;
applying the operation heater power to adjust the fly-height of a head; and
periodically updating the data structure based on environmental parameters measured during operation of the disk drive.

2. A method of dynamic fly-height control in a disk drive, the method comprising:
generating a data structure comprising a plurality of touch down heater powers, wherein each of the plurality of touch down heater powers corresponds to environmental parameters, the environmental parameters comprising temperature and pressure values, and wherein each of the plurality of touch down heater powers represents an estimated heater power required to expand an element into physical contact with a surface of a medium;
measuring current environmental parameters including a temperature and a pressure;
based on the data structure, determining an estimated touch down heater power that corresponds to the measured current environmental parameters;
determining an operation heater power based on the determined estimated touch down heater power, wherein said determining an operation heater power based on the determined touch down heater power comprises subtracting a predefined value from the estimated touch down heater power;
applying the operation heater power to adjust the fly-height of a head; and
periodically updating the data structure based on environmental parameters measured during operation of the disk drive.

3. A method of dynamic fly-height control in a disk drive, the method comprising:
generating a data structure comprising a plurality of touch down heater powers, wherein each of the plurality of touch down heater powers corresponds to environmental parameters, the environmental parameters comprising temperature and pressure values, wherein each of the plurality of touch down heater powers represents an estimated heater power required to expand an element into physical contact with a surface of a medium, and wherein the data structure comprises a touch down heater power for each of a plurality of intervals within predefined ranges of the environmental parameters;
measuring current environmental parameters including a temperature and a pressure;
based on the data structure, determining an estimated touch down heater power that corresponds to the measured current environmental parameters;
determining an operation heater power based on the determined estimated touch down heater power;
applying the operation heater power to adjust the fly-height of a head; and
periodically updating the data structure based on environmental parameters measured during operation of the disk drive.

4. A method of dynamic fly-height control in a disk drive, the method comprising:

generating a data structure comprising a plurality of touch down heater powers, wherein each of the plurality of touch down heater powers corresponds to environmental parameters, the environmental parameters comprising temperature and pressure values, wherein each of the plurality of touch down heater powers represents an estimated heater power required to expand an element into physical contact with a surface of a medium, and wherein generating the data structure comprises determining the plurality of touch down heater powers corresponding to initial ambient environmental parameters prior to deployment of the disk drive;

measuring current environmental parameters including a temperature and a pressure;

based on the data structure, determining an estimated touch down heater power that corresponds to the measured current environmental parameters;

determining an operation heater power based on the determined estimated touch down heater power;

applying the operation heater power to adjust the fly-height of a head; and periodically updating the data structure based on environmental parameters measured during operation of the disk drive.

5. The method of claim 4, wherein updating the data structure comprises:

determining a current touch down heater power corresponding to the current environmental parameters; and storing the current environmental parameters and corresponding current touch down heater power in the data structure.

6. The method of claim 5, wherein said determining an estimated touch down heater power comprises using the current environmental parameters to interpolate an estimated touch down heater power from the data structure.

7. The method of claim 5, wherein periodically updating the data structure comprises updating the data structure when the current environmental parameters reach predetermined values.

8. The method of claim 1, wherein the pressure values range from 120 kPa to 58 kPa.

9. The method of claim 1, wherein the environmental parameters corresponding to each of the plurality of touch down heater powers and the current environmental parameters further comprise a humidity value.

10. The method of claim 2, wherein the environmental parameters corresponding to each of the plurality of touch down heater powers and the current environmental parameters further comprise a humidity value.

11. The method of claim 3, wherein the environmental parameters corresponding to each of the plurality of touch down heater powers and the current environmental parameters further comprise a humidity value.

12. The method of claim 4, wherein the environmental parameters corresponding to each of the plurality of touch down heater powers and the current environmental parameters further comprise a humidity value.

13. The method of claim 2, wherein the pressure values range from 120 kPa to 58 kPa.

14. The method of claim 3, wherein the pressure values range from 120 kPa to 58 kPa.

15. The method of claim 4, wherein the pressure values range from 120 kPa to 58 kPa.

* * * * *